Feb. 6, 1940.   H. R. UBER   2,188,968
CUSHIONING DEVICE FOR BICYCLE FORKS AND THE LIKE
Filed April 27, 1938   2 Sheets-Sheet 1
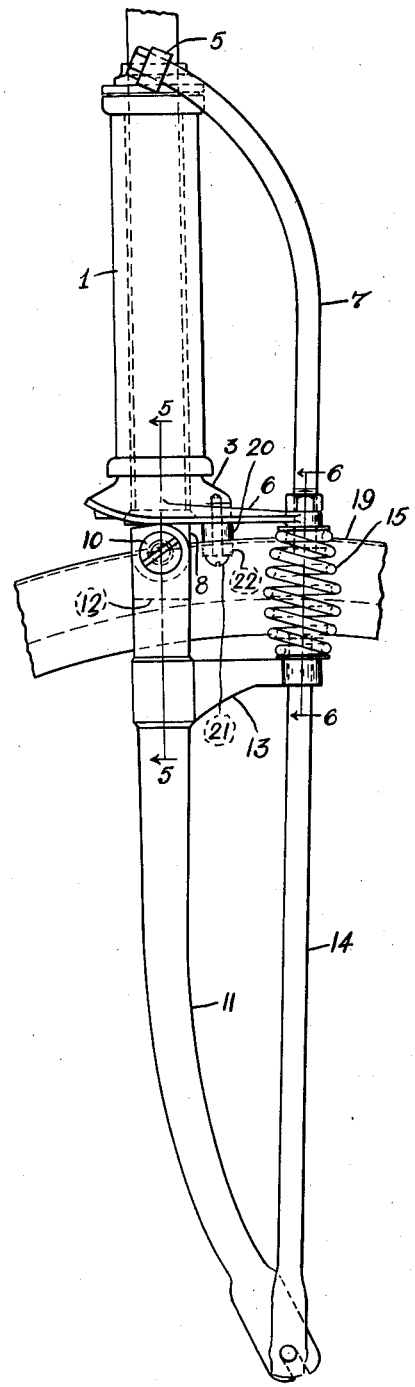
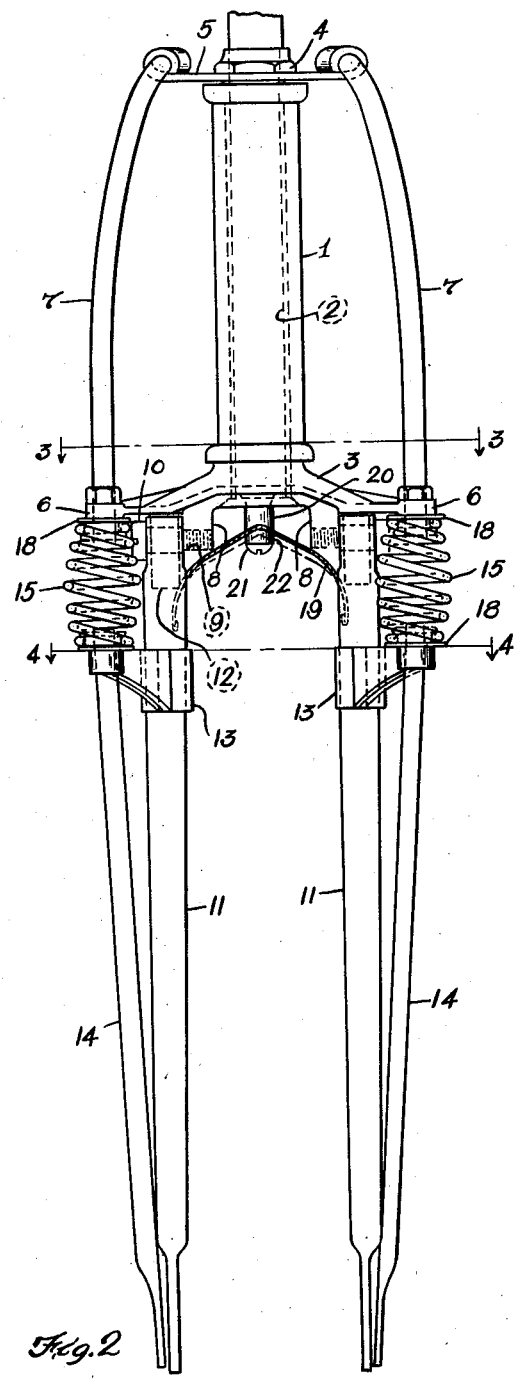
Fig. 1
Fig. 2
INVENTOR.
Harold R. Uber
BY
Ray, Oberlin & Ray
ATTORNEYS.

Feb. 6, 1940.   H. R. UBER   2,188,968
CUSHIONING DEVICE FOR BICYCLE FORKS AND THE LIKE
Filed April 27, 1938   2 Sheets-Sheet 2

INVENTOR.
Harold R. Uber
BY
Fay, Oberlin & Fay
ATTORNEYS.

Patented Feb. 6, 1940

2,188,968

UNITED STATES PATENT OFFICE 2,188,968

CUSHIONING DEVICE FOR BICYCLE FORKS AND THE LIKE

Harold R. Uber, Lakewood, Ohio, assignor to The Cleveland Welding Company, Cleveland, Ohio, a corporation of Ohio Application April 27, 1938, Serial No. 204,693

2 Claims. (Cl. 280—276)

This invention relates, as indicated to cushioning devices, but has reference more particularly to a cushioned action for the front forks of bicycles.

The primary object of the invention is to provide a device of the character described, which will be effective to absorb shocks to the frame of the bicycle and to the rider occasioned by the striking of obstructions and other irregularities in the road, and which will insure a smooth, vibrationless ride.

Another object of the invention is to provide a device of the foregoing character, which consists of a minimum number of easily manufactured and assembled parts of rugged construction.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 is a side elevation of the front fork of a bicycle embodying the novel features of the invention;

Fig. 2 is a front elevation of said fork;

Figure 5:
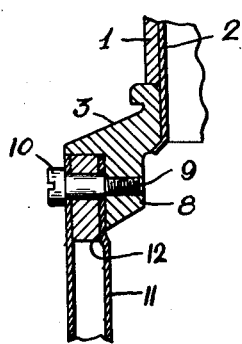
Fig. 5 is a vertical cross-sectional view, taken on the line 5—5 of Fig. 1.
Figure 6:
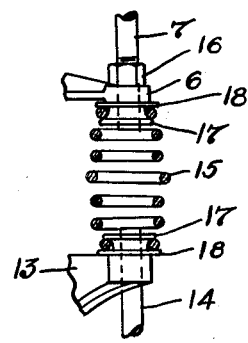
Fig. 6 is a vertical cross-sectional view, taken on the line 6—6 of Fig. 1.
Figure 7:
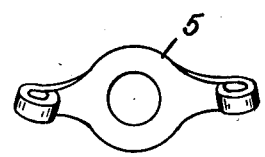
Fig. 7 is a plan view of the fork brace rod support.

Referring more particularly to Figs. 1 to 7 inclusive of the drawings 1 designates the tubular head of the frame of a bicycle, and through which extends the tubular post 2 of the bicycle fork. Secured to the lower end of the post 2, as by welding or the like, is a fork brace 3. The brace 3, as shown in Fig. 5, engages the lower end of the head 1, and the upper end of the post 2 has secured thereto at its upper end a nut 4, between which and the upper end of the head 1 is interposed a bracket 5, axial movement of the bicycle fork being thus restrained.

Figure 3:
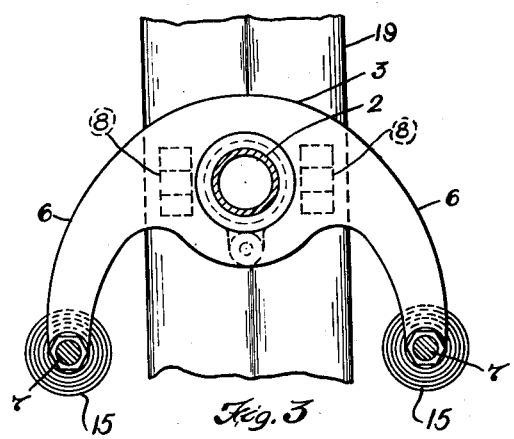
Fig. 3 is a horizontal cross-sectional view, taken on the line 3—3 of Fig 2.
Figure 4:
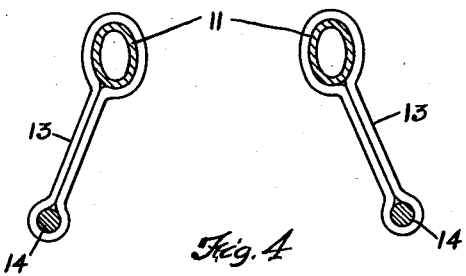
Fig. 4 is a horizontal cross-sectional view, taken on the line 4—4 of Fig. 2.

The brace 3, as shown most clearly in Fig. 3, is provided with a pair of curved, laterally-spaced, forwarded extending arms 6 having openings in the forward ends thereof for the reception of upper truss rods 7, and is also provided with a pair of laterally-spaced downwardly-extending lugs 8 having horizontal threaded apertures 9 therein.

Pivotally secured to the lugs 8 of the fork brace, as by means of shouldered studs 10 are the hollow furcations 11 of the fork, solid metallic inserts 12 being provided for the upper ends of these furcations to provide a better bearing for the studs. The furcations 11 have rigidly secured near their upper ends fork arms 13 having openings in their forward ends which are substantially in vertical alignment with the openings in the fork brace arms 6, for the reception of lower truss rods 14. The truss rods 14 are pivotally secured to the front wheel axle of the bicycle, in the usual manner, as are the furcations 11 of the fork.

Interposed between the forward end of the brace arms 6 and the forward ends of the fork arms 13 are helical springs 15, these springs being preferably of double conical form and being in alignment with the openings in the arms 6 and 13. The upper ends of the truss rods 7 are anchored to the bracket 5 in the manner shown in Figs. 1 and 2, while the lower ends of these rods extend through the openings in the forward portions of the arms 6 and into the springs 15, being anchored to such springs by means of nuts 16 and 17. The nuts 16 directly engage the arms 6, and the nuts 17, which are conical in form, engage the uppermost convolutions of the springs 15, clamping such convolution between them and washers 18, which are interposed between the springs and the arm 6. The upper ends of the truss rods 14 extend through the openings in the forward portions of the arms 13 and into the springs 15, being anchored to such springs by means of a conical nut 17 and washers 18, the nuts engaging the lowermost convolutions of the springs and clamping such convolutions between them and the washers.

The front mud guard 19 of the bicycle, which, in this case, is secured directly to the front wheel (not shown) has portions thereof cut away at the sides to accommodate passage of the furcations 11 of the fork, and between this guard and the brace 3, there is interposed a piece 20 of sponge rubber or similar cushioning material, which is secured in position by means of a screw 21 extending through the mud guard and into the fore brace, a second piece 22 of sponge rubber being inserted between the mud guard and the head of the screw.

It will be apparent from the foregoing, that the fork is of articulated construction, and that the extent of pivotal movement between the parts of the fork is limited by means of the truss rods and their interposed springs.

When the rider is seated upon the bicycle, the frame will descend to a slight extent, thereby causing the furcations 11 of the fork to rotate in a counter-clockwise direction (Fig. 1) about their pivots, i. e., about the studs 10. At the same time, the springs 15 are compressed by the fork arms 13, the springs thus cushioning all loads imposed upon the bicycle frame. When the front wheel strikes an obstruction in the road, the furcations 11 tend to move in a clockwise direction about their pivots, and at the same time, the rods 14 move downwardly, thereby elongating the springs 15 somewhat, and avoiding strains on the frame of the bicycle.

The springs thus tend to absorb all shocks of riding and insure a smooth, vibrationless ride. Since the mud guard 19 is, in this case, secured directly to the front wheel, it will have a limited movement, as indicated by the dotted lines in Fig. 2, but such movement will be cushioned by the sponge rubber pieces 20 and 22, so that rattling of the mud guard on the frame is avoided.

Figure 8:
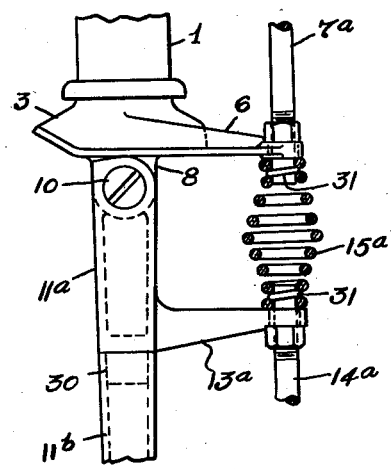
Fig. 8 is a view, similar to Fig. 1, but showing a modified form of the invention.

In the modified form of the invention shown in Fig. 8, the furcations of the fork are formed of two separate members 11a and 11b. Each member 11a is in the form of a steel forging which is pivoted to the fork brace 3 by means of the stud 10, and has formed integrally therewith a fork arm 13a, which serves the same purpose as the separate fork arm 13. The member 11a is further provided with a tenon 30 which extends into the member 11b of the fork, the members being rigidly secured to each other by welding or the like. The springs 15a are of somewhat modified form, and the truss rods 7a and 14a each have a thread 31 formed adjacent one end of the rod, whereby the rod may be threadedly secured to the end convolutions of the springs. This eliminates the need for washers.

Figure 9:
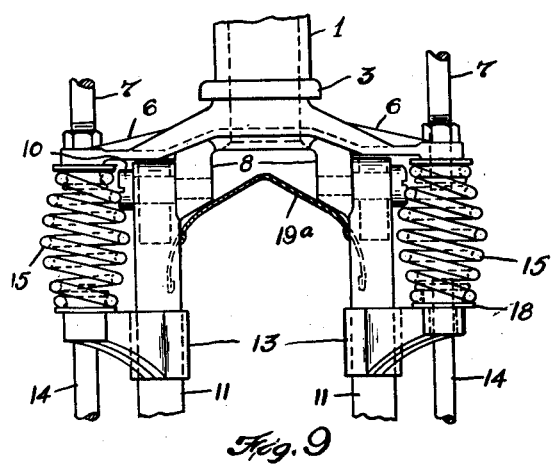
Fig. 9 is a view, similar to Fig. 2, but showing a somewhat different manner of supporting the mud guard.

In that form of the invention shown in Fig. 9, the mud guard 19a is secured, as by welding or the like, directly to the fork of the bicycle, so that it is unnecessary to use sponge rubber pieces, as in Fig. 2.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A truss construction for forks for bicycles and the like comprising an upper truss rod, a lower truss rod and a spring, the lower end of said upper truss rod being spaced from the upper end of said lower truss rod and said spring being attached to said ends whereby it may act in compression or tension in accordance with the movement of the lower end of said lower truss rod with respect to the upper end of said upper truss rod.

2. A truss construction for forks for bicycles and the like comprising a pair of upper truss rods, a pair of lower truss rods and a pair of coil springs, the lower ends of said upper truss rods being spaced from the upper ends of said lower truss rods and each of said springs being attached to one of said lower ends and to one of said upper ends, whereby it may act in compression or tension in accordance with the movements of one of the lower ends of one of the lower truss rods with respect to the upper end of one of said upper truss rods.

HAROLD R. UBER.